United States Patent [19]
Dimmick

[11] Patent Number: 5,822,049
[45] Date of Patent: Oct. 13, 1998

[54] OPTICAL FIBER COUPLER TYPE WAVELENGTH MEASURING APPARATUS

[75] Inventor: Timothy E. Dimmick, Glenville, Pa.

[73] Assignee: The United States of America as represented by the Director of the National Security Agency, Washington, D.C.

[21] Appl. No.: 847,584

[22] Filed: Apr. 24, 1997

[51] Int. Cl.$^6$ .................................................. G01N 21/00
[52] U.S. Cl. .............................................................. 356/72
[58] Field of Search ........................... 356/72, 73.1, 300, 356/346; 385/12, 28, 29, 31, 45, 127; 250/227.16, 227.18, 227.23, 231.1, 458.1

[56] References Cited

U.S. PATENT DOCUMENTS

| | | | |
|---|---|---|---|
| 5,260,566 | 11/1993 | Reed | 250/227.16 |
| 5,313,065 | 5/1994 | Reed | 250/368 |
| 5,323,409 | 6/1994 | Laskoskie . | |
| 5,412,746 | 5/1995 | Rossberg et al. | 385/48 |
| 5,416,578 | 5/1995 | Ohiki . | |
| 5,682,453 | 10/1997 | Daniel et al. | 385/99 |

OTHER PUBLICATIONS

T. Woschnik, and W. Behmenburg, "A Wavemeter for Controlled Funing of Near I.R. Diode Lasers," *Spectrochimica Acta.*, vol. 44B, pp. 949–955, 1989.

J.C. Braasch, W. Holzapfel, and S. Holzapfel, and S. Neuschaefer–Rube "Wavelength Determination of Semiconductor Lasers: Precise but Inexpensive," *Optical Engineering*, vol. 34, pp. 1417–1420, 1995.

*Primary Examiner*—Frank G. Font
*Assistant Examiner*—Michael P. Stafira
*Attorney, Agent, or Firm*—Stephen M. Bloor

[57] ABSTRACT

A fiber optic wavelength measuring apparatus using the wavelength dependent nature of a fused fiber coupler to measure the wavelength of light propagating in an optical fiber. The input light is coupled, using a fused fiber coupler, of the type commonly used as wavelength division mutiplexers, into two fibers and the light in these two fibers is then measured using a pair of fiber coupled photodiodes. The ratio of the optical power of light in the two fibers corresponds to the wavelength of the input light. Hence it is possible to perform precise real-time measurement of the wavelength of light in a fiber with a compact, inexpensive, and field rugged apparatus.

2 Claims, 7 Drawing Sheets

OPTICAL FIBER COUPLER TYPE WAVELENGTH MEASURING APPARATUS

FIELD OF THE INVENTION

The present invention, an optical fiber coupler type wavelength measuring apparatus, relates to optics measuring and testing, and more particularly, to the measurement of the wavelength of light using the wavelength dependent nature of optical fused fiber couplers.

BACKGROUND OF THE INVENTION

With the advent of fiber-optic communication systems, particularly those which carry multiple optical signals that are differentiated by wavelength, precise measurement and control of the wavelength of light propagating in optical fibers has become important. In particular, with the development of erbium doped optical amplifiers that provide optical gain at wavelengths in the vicinity of 1.55 μm, communication systems which utilize a multiplicity of closely spaced wavelengths have been demonstrated. These wavelengths must be monitored and maintained to tight tolerances in order for these systems to operate properly. Traditional devices for determining the wavelength of optical signals, such as dispersed light spectrometers and interferometers, can be very accurate but are complex, large, expensive to fabricate, and require complicated procedures to measure the light wavelength. They are not well suited for use outside of a laboratory environment or for application as a component part of a field-deployable device due to their size, complexity, or sensitivity to environmental conditions. As a result of the limitations of the aforementioned devices, several devices have been developed which provide moderate wavelength measurement accuracy of less than plus or minus 0.2 nanometers but are much less complex.

One such device, reported by Braasch, Holzapfel, and Neuschaefer-Rube, in an article entitled: "Wavelength Determination of Semiconductor Laser: Precise but Inexpensive," *Optical Engineering*, Vol. 34, pp. 1417–1420, 1995, determines wavelength by measuring the ratio of the wavelength-dependent responsivity of two photodiodes vertically integrated on a common substrate. This device involves the custom fabrication of a semiconductor photodiode where the responsivity versus wavelength is controlled via impurity doping. In such a device high accuracy is difficult to obtain because the responsivity varies slowly with wavelength over hundreds of nanometers. Additionally, such a device is expensive to produce in small quantities and requires the availability of a suitable semiconductor material system to cover the wavelength range of interest. A suitable material system may not be available for all desired wavelength ranges.

The present invention does not require the fabrication of semiconductor photodiodes or their integration on a substrate. Instead it uses the wavelength dependency of the coupling coefficient of the readily available and inexpensive fused fiber coupler itself to determine wavelength. Such a fused fiber coupler device can be manufactured to operate in any range in which single mode fiber can be fabricated. Further, very high resolution may be obtained by the present invention using the wavelength dependent nature of fused fiber couplers which have a coupling coefficient that varies sharply with wavelength.

Another device, reported by Woschnik and Behmenburg in an article entitled: "A Wavemeter for Controlled Tuning of Near I.R. Diode Lasers," *Spectrochimica Acta.*, Vol. 44B, pp. 949–955, (1989), uses a bulk optical color filter oriented at an angle to the incoming optical beam. Since the device is fabricated from bulk optical elements, alignment of these elements with respect to one another, as well as with respect to the incoming laser beam, is critical to the performance of the device. Variation in the alignment due to mechanical shock, temperature or drift in the incoming laser alignment would have deleterious effects on the wavemeter's accuracy. In addition, the cut-off wavelength of the color filter is extremely sensitive to temperature resulting in a wavelength error of 0.25 nm per degree centigrade, necessitating tight temperature control of the apparatus. Also, the off-axis orientation of the color filter would lead to wavelength error if the polarization state of the laser to be measured varied relative to the laser used during calibration of the device.

The present invention is ideally suited for the measurement of fiber-coupled light sources and is less susceptible to coupling losses and reliability and accuracy deterioration due to mechanical shock, temperature, or drift in the incoming laser alignment.

Waveguide type wavelength measuring devices have also been developed to overcome some of the aforementioned limitations, such as the apparatus invented by Hiroshi Ohki and Jun Iwasaki, "Waveguide Type Wavelength Measuring Apparatus," U.S. Pat. No. 5,416,578, but these devices are difficult to manufacture, require precise alignment of the optical fiber to the waveguide structure, with a critical mechanical coupling maintained to extremely tight tolerances, and suffer from a mismatch between the mode profile inevitable when coupling between a channel type guide and a cylindrical type guide (optical fiber). These devices are manufactured by forming channel type waveguide structures within a planar substrate, typically using photolithographically controlled ion implantation techniques. The waveguides thus formed are channel type waveguides which have a nominally rectangular cross section. In order to measure the wavelength of light propagating within an optical fiber using these devices, the optical fiber would have to be precisely aligned to the waveguide structure. This precise alignment is difficult to accomplish and adds significantly to the cost of manufacture. In addition, due to the mismatch between the mode profiles inevitable when coupling between a channel type guide and a cylindrical type guide, such as an optical fiber, loss of optical power will occur even if perfect mechanical alignment were possible. Also, the critical mechanical coupling between the channel type guide and the optical fiber carrying the input light is a potential failure point since this alignment must be maintained to extremely tight tolerances, on the order of one to two micrometers, over stresses imposed by aging and potentially adverse environmental conditions.

The present invention discloses a device for measuring the wavelength of light propagating within optical fibers very precisely with a compact, robust, inexpensive structure made of readily available components and without the need for custom fabrication of semiconductor photodiodes or the problems associated with coupling between fiber and a planar channel type waveguide structure. Additionally, the disclosed device is less susceptible than the devices of the prior art to measurement variations due to optical element alignment, mechanical shock, and temperature.

SUMMARY OF THE INVENTION

In consideration of the problems detailed above and the discrepancies enumerated in the partial solutions thereto, an object of the present invention is to precisely measure the wavelength of light.

Another object of the present invention is to measure the wavelength of light with a compact and inexpensive system.

Another object of the present invention is to provide a compact and inexpensive wavelength measuring apparatus capable of accurate operation in an outside field environment.

Another object of the present invention is to provide a compact and simple wavelength measuring apparatus that is less susceptible than the prior art to optical element alignment errors, mechanical shock, and temperature.

In order to attain the objectives described above, according to an aspect of the present invention, there is provided an optical coupler type wavelength measuring apparatus. The present invention relates to a wavelength measuring apparatus capable of measuring the wavelength of light in an optical fiber very precisely with a compact, robust, and inexpensive structure made of readily available components.

More particularly, the fused fiber coupler based wavemeter uses the wavelength dependency of the coupling coefficient of the fused coupler to measure the optical wavelength of the incident light. The input light is coupled, using a fused fiber coupler, of the type commonly used as wavelength division mutiplexers, into two fibers and the light in these two fibers is then measured using a pair of fiber coupled photodiodes. The outputs of the photodiodes are then compared using known means and the ratio of the powers of light in the two fibers, as detected by the photodiodes, corresponds to the wavelength of the input light.

DETAILED DESCRIPTION OF THE PREFERRED EMBODIMENTS

Figure 1:
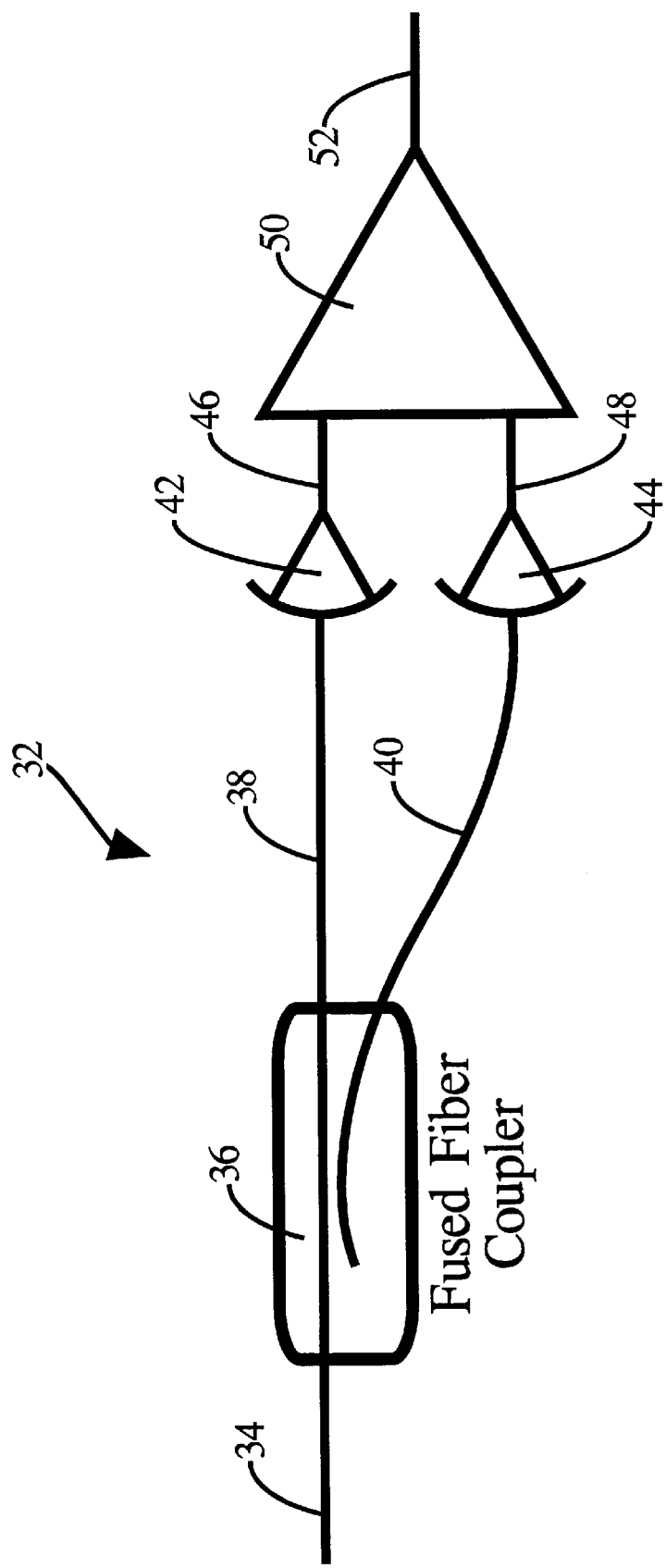
FIG. 1 is a schematic drawing of an optical fiber coupler type wavelength measuring apparatus according to a preferred embodiment of the present invention.

FIG. 1 schematically shows the first preferred embodiment of the present invention, an optical fiber coupler type wavelength measuring apparatus 32. The optical fiber coupler type wavelength measuring apparatus 32 has a fused fiber coupler 36, of the type commonly used as wavelength division mutiplexers (WDM), with one fiber input 34, a first fiber output 38, and a second fiber output 40. The two fiber outputs 38 and 40 are, respectively, optically connected to two fiber coupled photodiodes, a first 42 and a second 44. The first photodiode 42 has an optical input 38 and an electrical output 46, and the second photodiode has an optical input 40 and an electrical output 48. The photodiodes 42 and 44 produce electrical signals on their outputs 46 and 48 corresponding to the light impinging upon them. The photodiode outputs 46 and 48 are respectively electrically connected to the inputs of a comparator 50, the first photodiode output 46 to the first input and the second photodiode output 48 to the second input, which compares the electrical signals generated in the two fiber coupled photodiodes 42 and 44 and produces a signal on its output 52 corresponding to the ratio of the output of the first fiber coupled photodiode 42 to the output of the second 44.

In the apparatus 32 shown in FIG. 1, the light to be measured is made to propagate in a single mode input fiber optically connected to the fused fiber coupler 36 fiber input 34. The propagated light is thus input into the fused fiber coupler 36. The apparatus 32 uses the wavelength dependence of the coupling coefficient of the fused fiber coupler 36 to measure optical wavelength.

The coupler is designed such that light of wavelength $\lambda_1$ is routed to the first fiber output 38 and light of wavelength $\lambda_2$ is routed to the second fiber output 40. At wavelengths, $\lambda$, intermediate to $\lambda_1$ and $\lambda_2$, provided $\lambda_2-\lambda_1 \ll \lambda$, the coupling coefficient for the first fiber output 38, $\eta_{38}$, is given to good approximation by:

$$\eta_{38} = \sin^2\left(\frac{\pi(\lambda - \lambda_1)}{2(\lambda_2 - \lambda_1)}\right)$$

and the coupling coefficient for the second fiber output 40, $\eta_{40}$, is given to good approximation by:

$$\eta_{40} = \cos^2\left(\frac{\pi(\lambda - \lambda_1)}{2(\lambda_2 - \lambda_1)}\right).$$

The fused fiber coupler 36 splits the incoming light into two single mode fiber outputs, a first 38 and a second 40, which direct the light, respectively, to the first 42 and second 44 fiber coupled photodiodes. The optical power of the light in each of the two single mode fiber outputs, the first 38 and the second 40, is respectively detected by the first 42 and second 44 fiber coupled photodiodes, each producing an electrical signal on its respective output corresponding to the optical power in each of the two single mode fiber outputs 38 and 40.

If the optical power spectral density input to the fused fiber coupler 36 is given by $\phi(\lambda)$, then the photocurrents on the electrical signal outputs 46 and 48, $I_{46}$ and $I_{48}$ respectively, will be given by:

$$I_{46} = \int_{\Delta\lambda} R_{42}\phi(\lambda)\sin^2\left(\frac{\pi(\lambda - \lambda_1)}{2(\lambda_2 - \lambda_1)}\right) d\lambda$$

and $$I_{48} = \int_{\Delta\lambda} R_{44}\phi(\lambda)\cos^2\left(\frac{\pi(\lambda - \lambda_1)}{2(\lambda_2 - \lambda_1)}\right) d\lambda$$

where $\Delta\lambda$ is the spectral bandwidth of the incident light and $R_{42}$ and $R_{44}$ are the responsivitities of photodiodes 42 and 44 respectively.

The electrical signal outputs 46 and 48 from the two fiber coupled photodiodes 42 and 44 are compared in a comparator 50 which produces a signal on its output 52 corresponding to the ratio of the photocurrent output of the first fiber coupled photodiode 42 to the photocurrent output of the second 44. This comparator 50 produces a signal on its output 52 that corresponds to the wavelength of the light being measured.

The fused fiber coupler 36 is fabricated by a well known technique which involves heating and pulling two single mode fibers to create a region where the fiber cores are in close enough proximity that significant coupling between the modes takes place. Since the fused coupler is constructed from optical fiber, the device is ideally suited for the measurement of fiber coupled light sources and is superior to devices based on bulk optic components or channel waveguide type devices where coupling losses and reliability due to the mechanical joint necessary for coupling are added concerns. Fused couplers may be fabricated from any single mode fiber regardless of the wavelengths supported and consequently, this apparatus may be applied to any wavelength range over which single mode fiber can be fabricated. This makes this apparatus superior to the methods of Braasch, Holzapfel, and Neuschaefer-Rube which require that suitable semiconductor material systems be available for the desired wavelength range. Furthermore, very high resolution may be obtained by employing a fused coupler with a coupling coefficient that varies sharply with wavelength. Such couplers are manufactured by increasing the length of the coupling region created when pulling the fibers.

Figure 2:
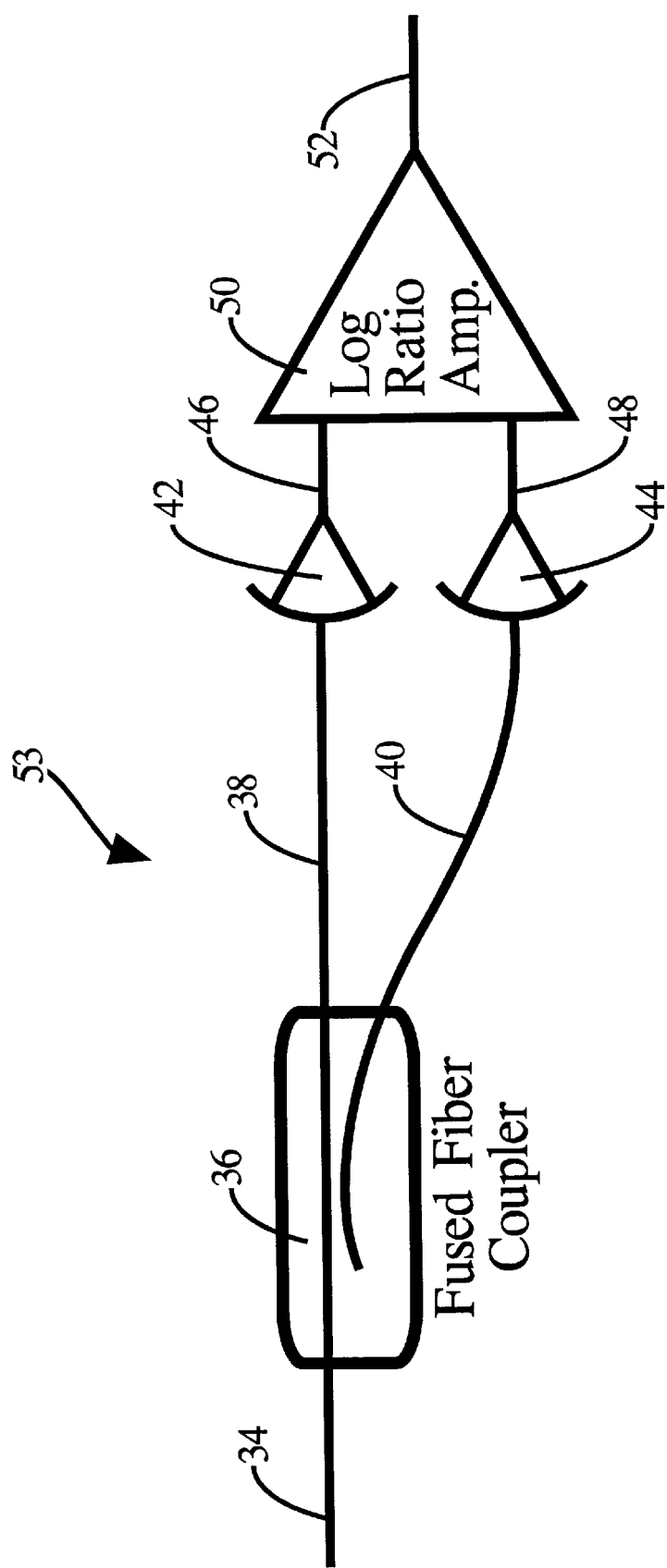
FIG. 2 is a schematic drawing of an optical fiber coupler type wavelength measuring apparatus according to the second preferred embodiment of the present invention, which employs a log-ratio amplifier for computation of the power ratios.

In a second embodiment of the present invention 53, shown schematically in FIG. 2, the comparator 50 is a log-ratio amplifier, having two signal inputs, a first 46 and a second 48, and a signal output 52. The optical power of the light in each of the two single mode fiber outputs, the first 38 and second 40 is respectively detected by the two fiber coupled photodiodes, a first 42 and a second 44, each producing an electrical signal on its respective outputs 46 and 48 corresponding to the optical power in each of the two single mode fiber outputs 38 and 40. The electrical signal outputs 46 and 48 from the two fiber coupled photodiodes 42 and 44 are respectively electrically connected to the log-ratio amplifier first and second signal inputs. The log-ratio amplifier signal output 52 produces a signal voltage, $V_M$, that corresponds to the wavelength of the input light, which can be described by:

$$V_M = K\log_{10}\left[\frac{R_{42}}{R_{44}} \tan^2\left(\frac{\pi(\lambda_L - \lambda_1)}{2(\lambda_2 - \lambda_1)}\right)\right]$$

for an input incident light which is monochromatic of wavelength $\lambda_L$ where K is the gain of the log-ratio amplifier. This apparatus 53 provides a smooth monotonic response for all wavelengths of $\lambda_L$ between $\lambda_1$ and $\lambda_2$. Thus if the wavelength of the light to be measured is known to be within a range of from $\lambda_1$ to $\lambda_2$, the wavelength can be inferred by measuring the signal voltage $V_M$.

Figure 3:
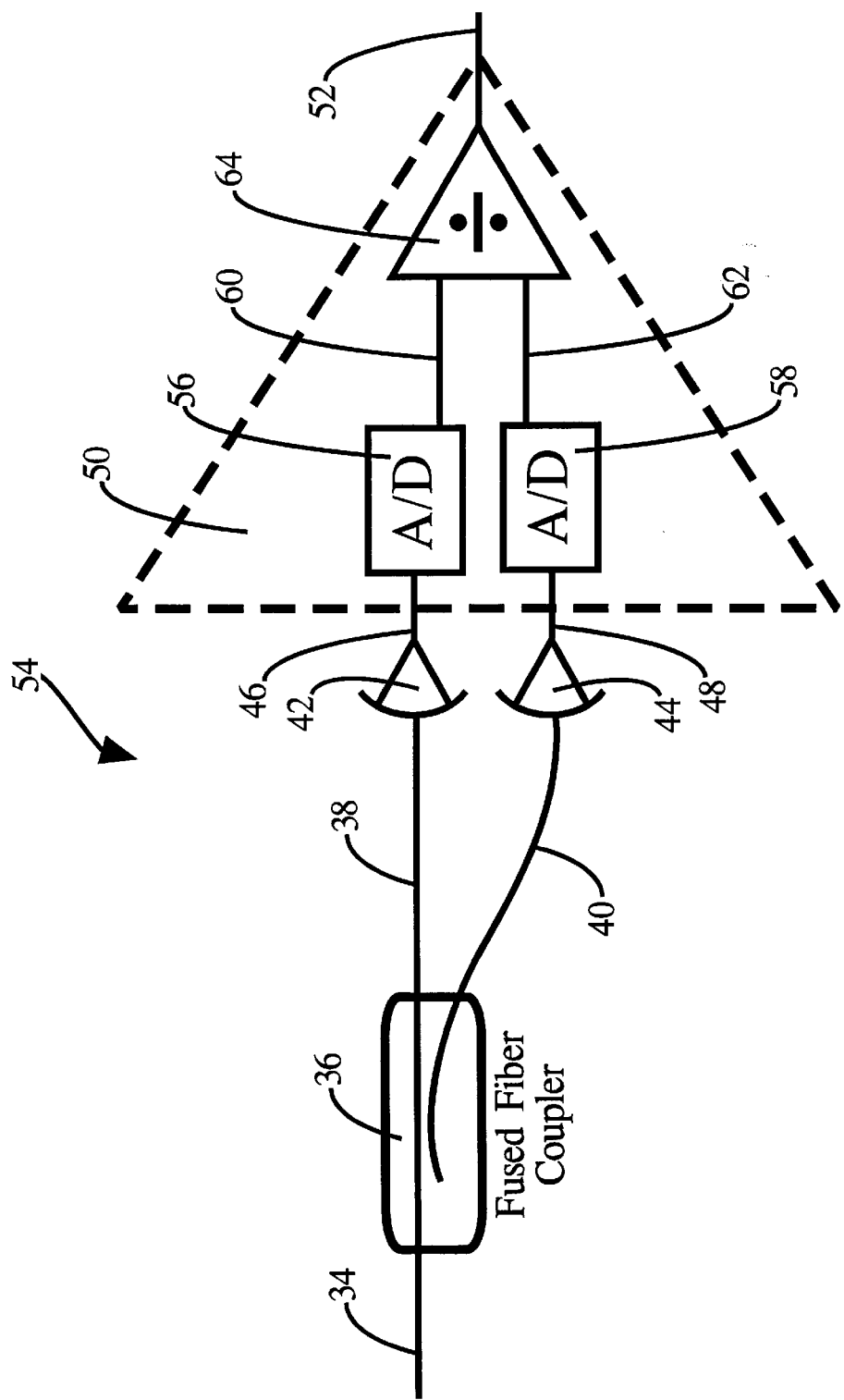
FIG. 3 is a schematic drawing of an optical fiber coupler type wavelength measuring apparatus according to the third preferred embodiment of the present invention, which employs analog to digital conversion of the output of the optical photodetectors and digital computation of the power ratios.

In a third embodiment of the present invention 54, shown schematically in FIG. 3, the comparator 50 is implemented using the digital techniques of a digital comparator. In this embodiment, the electrical signal output 46 from the first fiber coupled photodiode 42 and the output 48 from the second fiber coupled photodiode 44 are respectively connected to a first 56 and a second 58 analog to digital (A/D) converter which digitize the first 46 and second 48 electrical signal outputs. The respective digitized signal outputs 60 and 62 are then digitally compared by digital comparing means 64 which produces a signal on its output 52 corresponding to the ratio of the output of the first fiber coupled photodiode 42 to the output of the second 44. This ratio corresponds to the wavelength of the input light.

Figure 4:
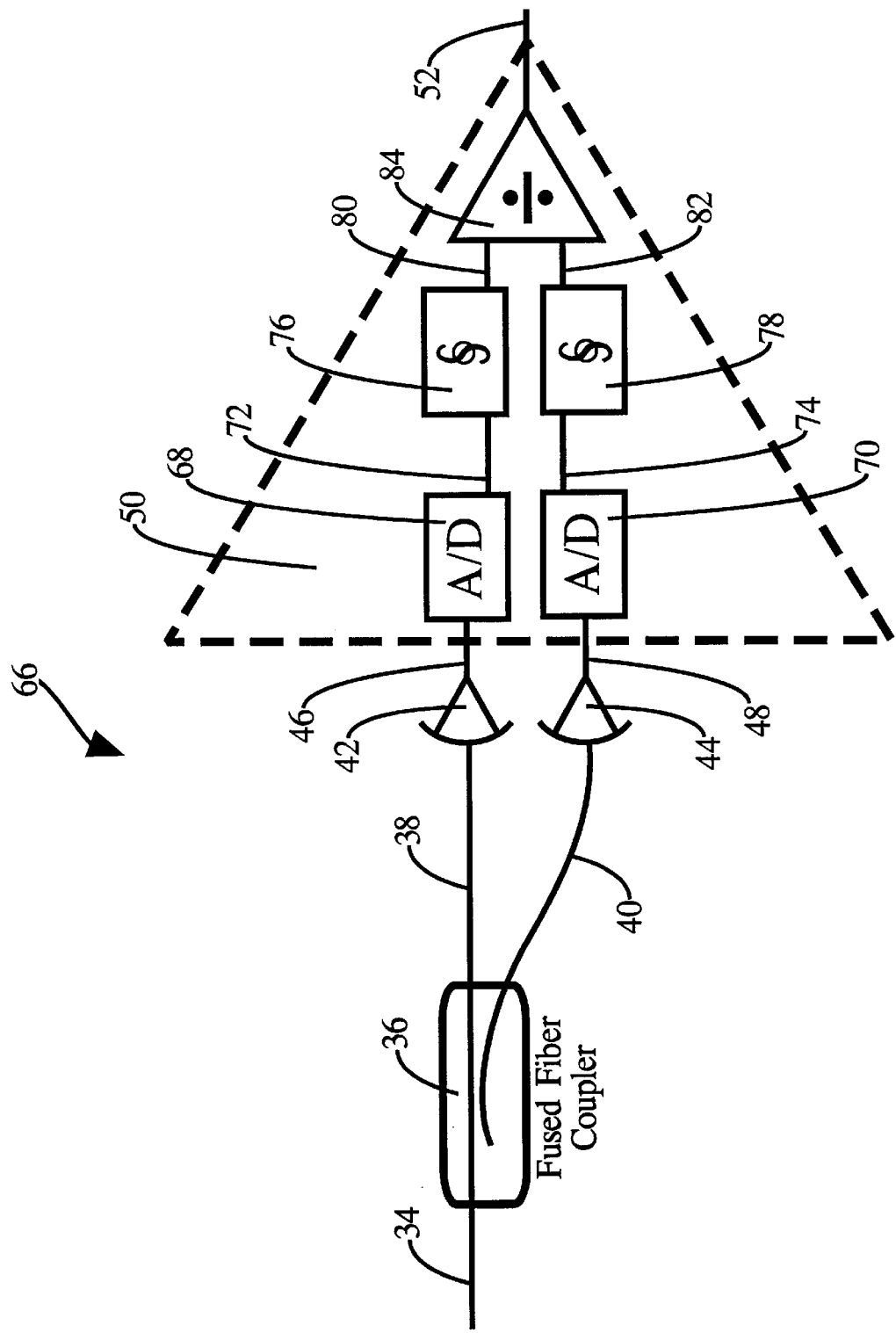
FIG. 4 is a schematic drawing of an optical fiber coupler type wavelength measuring apparatus according to the fourth preferred embodiment of the present invention, which employs analog to digital conversion of the output of the optical photodetectors, integration of those outputs, and digital computation of the power ratios.

In a fourth embodiment of the present invention 66, shown schematically in FIG. 4, the comparator 50 is implemented as an integrating digital comparator. In this embodiment, the first electrical signal output 46 from the first fiber coupled photodiode 42 and the second electrical signal output 48 from the second fiber coupled photodiode 44 are respectively connected to a first 68 and a second 70 analog to digital (A/D) converter which digitize the respective electrical signal outputs. To increase the sensitivity of the apparatus 66, in this embodiment, to permit operation at reduced light levels, the digitized electrical signal outputs 72 and 74 are respectively electrically connected to a first 76 and a second 78 digital integrator and the respective integrated outputs 80 and 82 are then digitally compared by digital comparing means 84 which produces a signal on its output 52 corresponding to the ratio of the output of the first fiber coupled photodiode 42 to the output of the second 44. This ratio corresponds to the wavelength of the input light.

Figure 5:
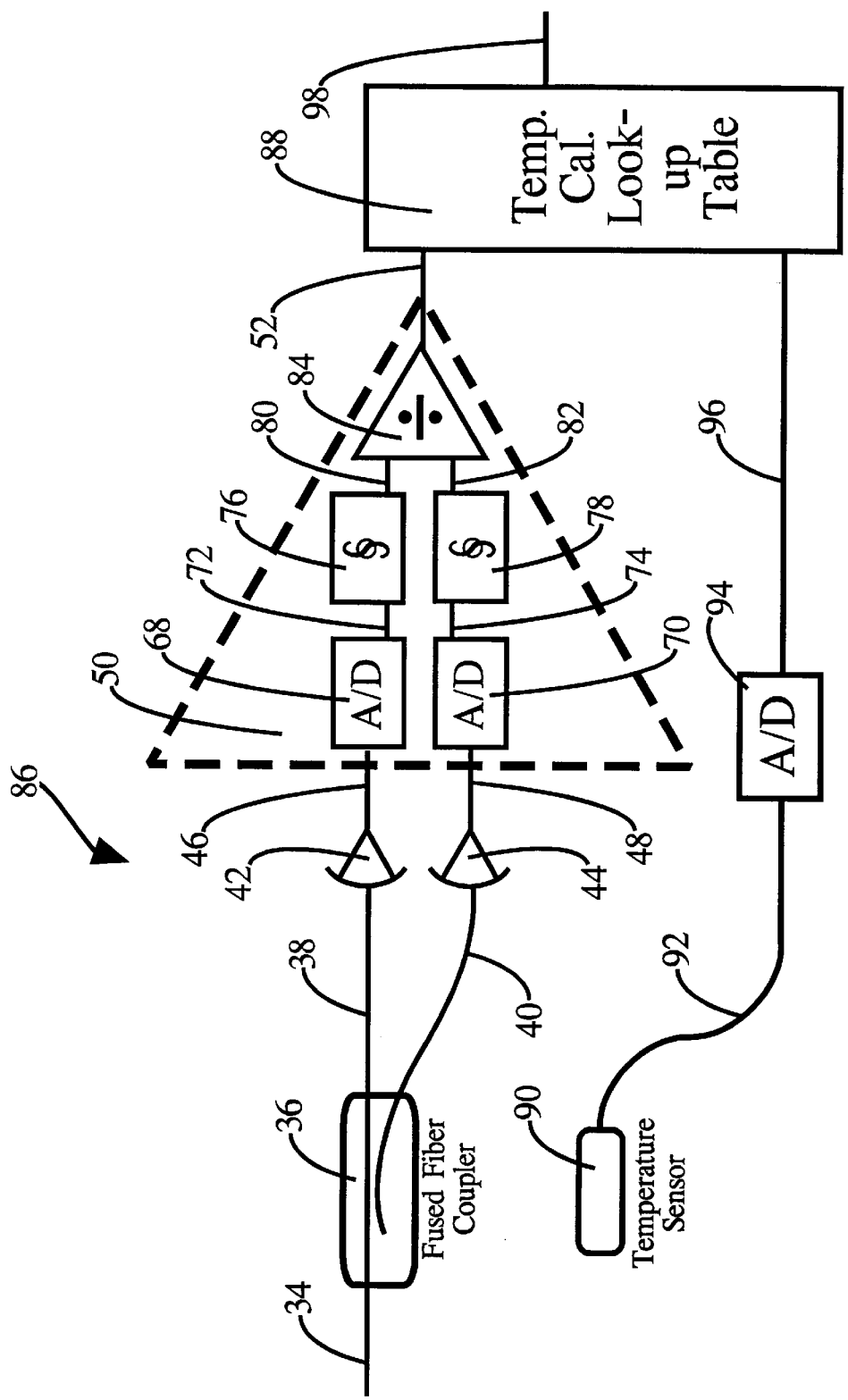
FIG. 5 is a schematic drawing of an optical fiber coupler type wavelength measuring apparatus according to the fifth preferred embodiment of the present invention, which employs analog to digital conversion of the output of the optical photodetectors, integration of those outputs, and digital computation of the power ratios corrected for temperature by use of a temperature sensor and calibration look-up table means.

In a fifth embodiment of the present invention 86, shown schematically in FIG. 5, the output of the digital integrating comparator 50 is temperature corrected by means of a temperature calibration look-up table 88 so as to reduce wavelength measurement error due to variation in the wavemeter output with temperature. To measure and correct for temperature, a temperature sensor 90 is introduced in proximity to the wavemeter and the output 92 of this temperature sensor is digitized by connection of the temperature sensor output 92 to an analog to digital converter 94. The digitized output 96 of the temperature sensor is input, along with the output 52 of the comparator 50, into the temperature calibrated look-up table means 88. The temperature calibration look-up table 88 provides temperature calibration information so as to remove temperature error from the wavemeter wavelength measurement and produces a signal on its output 98 which corresponds to the temperature corrected wavelength of the input light.

Figure 6:
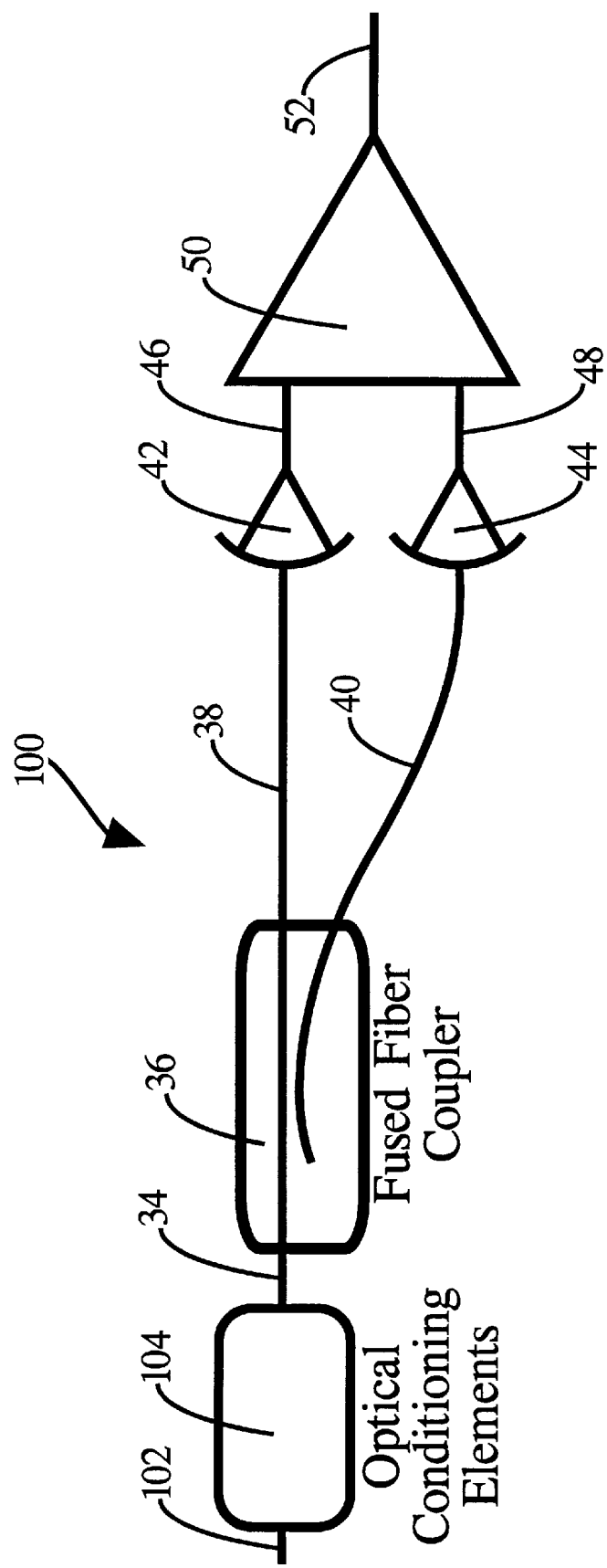
FIG. 6 is a schematic drawing of an optical fiber coupler type wavelength measuring apparatus according to the sixth preferred embodiment of the present invention, which employs an optical conditioning element at the input to the wavemeter.

The sixth embodiment 100 of the present invention is schematically shown in FIG. 6. An optical conditioner 104 is added to the first embodiment 32. The optical conditioner 104 might be implemented, for example, using any combination of the following elements: a fiber polarizer, an optical isolator, and an optical bandpass filter. The optical conditioner 104 has one optical input 102 and one optical output optically connected to the fused fiber coupler 36 fiber input 34. The combination of the fiber polarizer, optical isolator, and optical bandpass filter may be composed of any one, any two, or all three of the elements, in any order. The combination of elements is connected in optical series with and between the optical conditioner input 102 and the fused fiber coupler fiber input 34. The fiber polarizer fixes the input state of polarization (SOP) eliminating wavelength uncertainty due to polarization dependent losses and variations in the coupling coefficient of the fused fiber coupler 36 with SOP and eliminates SOP induced variations in the fiber coupled photodiodes 42 and 44. The optical isolator eliminates reflections from the wavemeter which might destabilize the optical source providing light to be measured. The optical bandpass filter improves the accuracy of the apparatus in an optically noisy environment by restricting the wavelength range of incoming light to a spectrally narrow source of interest. This eliminates much of the spectrally broad components of light often found in optically amplified signals.

Figure 7:
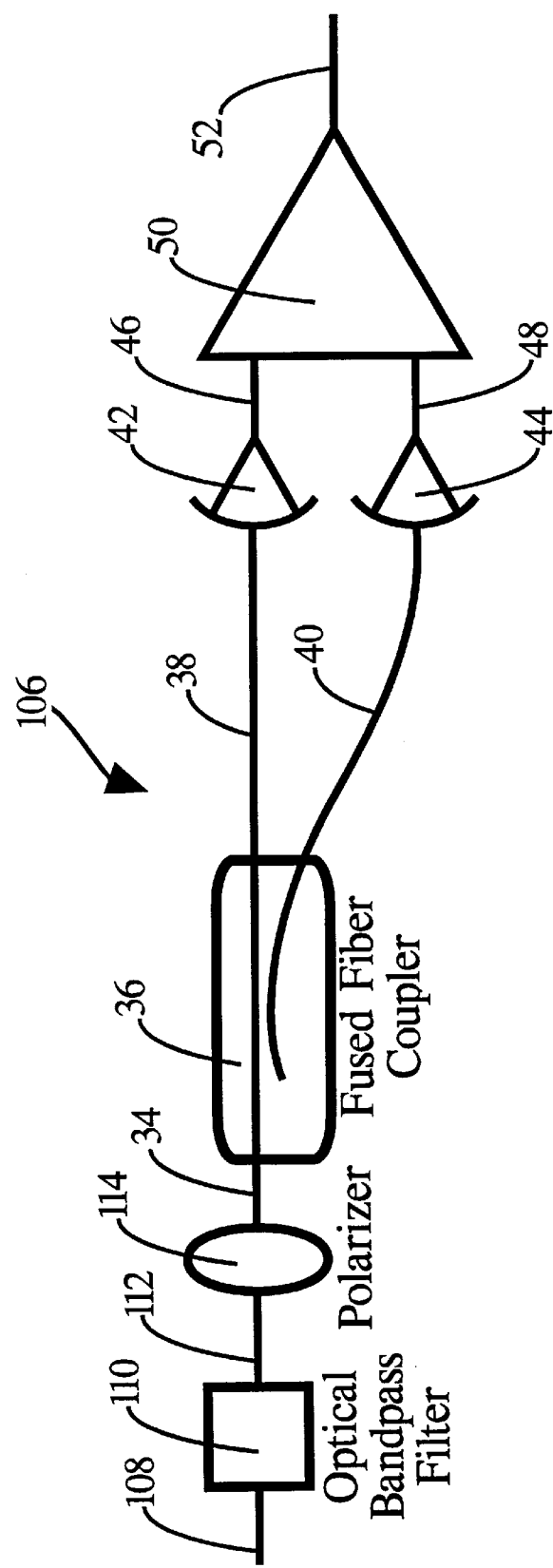
FIG. 7 is a schematic drawing of an optical fiber coupler type wavelength measuring apparatus according to the seventh preferred embodiment of the present invention, which employs an optical bandpass filter and a fiber polarizer at the input to the wavemeter.

The seventh embodiment 106 of the present invention is schematically shown in FIG. 7. An optical bandpass filter 110 and a fiber polarizer 114 are added to the first embodiment and this embodiment has been found to be the best mode of the apparatus for use in noisy optical communications systems. The optical bandpass filter 110 has one optical input 108 into which the light to be measured is input and one optical output 112. The fiber polarizer 114 has one optical input, optically connected to the output of the bandpass filter 112, and one output, optically connected to the fused fiber coupler 36 fiber input 34. The optical bandpass filter 110 improves the accuracy of the apparatus 106 in an optically noisy environment by restricting the wavelength range of the incident light to a spectrally narrow range of interest. This eliminates much of the spectrally broad components of light often found in optically amplified signals. The fiber polarizer 114 fixes the input state of polarization (SOP), eliminating wavelength uncertainty due to polarization dependent losses and variations in the coupling coefficient of the fused fiber coupler 36 with SOP, and eliminates SOP induced variations in the fiber coupled photodiodes 42 and 44.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. An optical fiber coupler type wavelength measuring apparatus, comprising:

a fused fiber coupler, having a fiber input for receiving light, the wavelength of which is to be measured, and a first and a second fiber output for transmitting light;

a first photodiode, having an optical input for receiving light connected to the first fiber output of said fused fiber coupler, and having an output for transmitting a first electrical signal corresponding to the intensity of light received at the input;

a second photodiode, having an optical input for receiving light connected to the second fiber output of said fused fiber coupler, and having an output for transmitting a second electrical signal corresponding to the intensity of light received at the input;

a first analog-to-digital converter, having an analog input connected to the output of said first photodiode, and a digital output for transmitting a digital signal corresponding to the analog signal received at the analog input of said first analog-to-digital converter;

a second analog-to-digital converter, having an analog input connected to the output of said second photodiode, and a digital output for transmitting a digital signal corresponding to the analog signal received at the analog input of said second analog-to-digital converter;

a first digital integrator for integrating the digital output of said first analog-to-digital converters, having an input electrically connected to the digital output of said first analog-to-digital converter for receiving the digital signal, and an output for transmitting an integrated digital signal corresponding to the integration of the digital signal received at the input of said first digital integrator over time;

a second digital integrator for integrating the digital output of said second analog-to-digital converters, having an input electrically connected to the digital output of said second analog-to-digital converter for receiving the digital signal, and an output for transmitting an integrated digital signal corresponding to the integration of the digital signal received at the input of said second digital integrator over time;

means for digitally comparing the output of said first digital integrator to the output of said second digital integrator and providing an output that corresponds to the wavelength of light received at the fiber input of said fused fiber coupler wherein accurate measurement of the wavelength of the received light is attained;

a temperature sensor for measuring the temperature of said optical fiber coupler type wavelength measuring apparatus, having an analog output;

a third analog-to-digital converter, having an analog input connected to the analog output of said temperature sensor, and an output for transmitting a digital signal corresponding to the analog signal received at the analog input of said third analog-to-digital converter; and means for correcting the wavelength measurement error due to variations in the temperature of said optical fiber coupler type wavelength measuring apparatus and providing a temperature compensated wavelength measurement by correcting the output of said digital comparing means for temperature with the output of said third analog-to-digital converter wherein accurate measurement of the wavelength of the received light is attained.

2. An optical fiber coupler type wavelength measuring apparatus, comprising:

a fused fiber coupler, having a single mode fiber input for receiving light of stable polarization, the wavelength of which is to be measured, a first and a second single mode fiber output for transmitting light, a long coupling region providing for a coefficient of coupling between the single mode fiber input and the second single mode fiber output that varies sharply with wavelength;

a first photodiode, having an optical input for receiving light connected to the first single mode fiber output of said fused fiber coupler, and having an output for transmitting a first electrical signal corresponding to the intensity of light received at the optical input;

a second photodiode, having an optical input for receiving light connected to the second single mode fiber output of said fused fiber coupler, and having an output for transmitting a second electrical signal corresponding to the intensity of light received at the optical input; and means for comparing said first and second electrical signals and providing an output signal that corresponds to the wavelength of light received at the single-mode fiber input of said fused fiber coupler wherein accurate measurement of the wavelength of the received light is attained.

* * * * *